United States Patent [19]

Cozzi et al.

[11] Patent Number: 5,023,294
[45] Date of Patent: Jun. 11, 1991

[54] AQUEOUS DISPERSIONS OF URETHANE-ACRYLIC POLYMERS AND THE USE THEREOF AS PAINTS

[75] Inventors: Ennio Cozzi, Milan; Natale Conti, Varese, both of Italy

[73] Assignee: Presidenza Del Consiglio Dei Ministri, Rome, Italy

[21] Appl. No.: 374,776

[22] Filed: Jul. 3, 1989

[30] Foreign Application Priority Data

Jul. 7, 1988 [IT] Italy .................. 21267 A/88

[51] Int. Cl.$^5$ .............................................. C08L 75/04
[52] U.S. Cl. .................................. 524/547; 524/813; 524/839
[58] Field of Search .................. 524/813, 839, 547

[56] References Cited

U.S. PATENT DOCUMENTS 3,684,759  8/1972  Reiff et al. .................. 524/457

Primary Examiner—Joseph L. Schofer
Assistant Examiner—Jeffrey T. Smith
Attorney, Agent, or Firm—Morgan & Finnegan

[57] ABSTRACT

Aqueous dispersions of urethane-acrylic polymers, giving coatings resistant to alkalies and organic solvents, are obtained by starting from organic polyisocyanates and mixtures consisting of macroglycols and polyols containing ionizable groups and at least one ethylenic unsaturation.

24 Claims, No Drawings

AQUEOUS DISPERSIONS OF URETHANE-ACRYLIC POLYMERS AND THE USE THEREOF AS PAINTS

DESCRIPTION OF THE INVENTION

The present invention relates to aqueous dispersions of urethane-acrylic polymers.

More particularly, the present invention relates to aqueous dispersions of urethane-acrylic polymers and to their application as paints.

Ecological and legal requirements demand more and more the replacement of solvent-soluble products used as coatings by water-soluble products.

The formation of stable aqueous dispersions of polyurethane to be used as water-proof coatings has been known many years and is based on the principle of introducing ionizable groups into the polyurethane molecule, as described for instance in U.S. Pat. No. 3,479,310 or in European Patent Application No. 220,000.

It is also known to form aqueous dispersions of urethane-acrylic polymers by which it is possible to obtain coatings showing the advantageous properties of polyurethane (mechnical, blocking and chemical resistance) as well as those of polyacrylates (low cost, resistance to weather, and light, high solids content).

In particular, in U.S. Pat. No. 4,318,833 the preparation is described of a water-dispersed polyurethane and then its polymerization "in situ" with ethylenically unsaturated monomers such as alkyl esters of acrylic and/or methacrylic acid. This technique has the drawback of not giving homogeneous molecular mixtures and it therefore does not allow one to obtain the properties of the urethane-acrylic polymer at optimum levels.

In European Patent Applications No. 98,752, 167,188 and 183,199 the above mentioned drawback is overcome in that the polyurethane, in the presence of which the polymerization of the ethylenically unsaturated monomers is carried out, already contains end groups of this type and therefore the finished product is more homogeneous.

Analogously, a higher homogenity of the urethane-acrylic polymer, because of the presence of an ethylenically unsaturated monomer during the formation of an isocyanic prepolymer, is described in U.S. Pat. No. 4,644,030.

According to the teachings of the above-mentioned patents, the homogeneous distribution of macromolecules should allow one to obtain coatings showing the advantageous properties of both polyurethanes and acryclic polymers; however, coatings obtained according to the prior art do not possess a high resistance to alkalies and organic solvents.

In accordance with the present invention, it has now been discovered that aqueous dispersions of urethane-acrylic polymers giving water-proof coatings endowed with high mechanical properties, high adhesion to different substrates, and having, in particular, high resistance to alkalies and organic solvents, are obtained by starting from at least one organic polyisocyanate and a mixture consisting or consisting essentially of macroglycols and polyols containing ionizable groups and at least one ethylenic unsaturation.

Therefore, an object of the present invention is to provide aqueous dispersions of urethane-acrylic polymers containing in the macromolecule hydrophilic ionic groups, obtained according to the following operations:

a) preparation of an unsaturated oligourethane by allowing at least one organic polyisocyanate to react with a mixture comprising essentially at least a macroglycol and at least a polyol containing in the same molecule at least one ionizable group and at least one ethylenic unsaturation;

b) salification of the thus-obtained oligourethane;

c) dispersiion in water of the salified oligourethane, optionally in the presence of organic polyamines; and d) polymerization of the oligourethane with alphabeta-ethylenically unsaturated monomers.

According to the present invention, the oligourethane of point (a) is obtained from at least one polyisocyanate and a mixture of macroglycols and polyols in such amounts that the molar ratio between the isocyanic groups and the total sum of the hydroxyl groups is between 1.3 and 2, and preferably between 1.4 and 1.7.

The formation of the unsaturated oligourethane may be carried out either in the presence or in the absence of organic solvents.

If the reaction is carried out in the presence of organic solvents, these may be selected from cellosolve acetate, acetone, tetrahydrofurane, methylethylketone, etc.

Reaction temperatures are almost always below 100° C., and preferably between 60° and 90° C.

Furthermore, the reactions may be performed in the presence of per se known catalysts, such as organometallic compounds and tertiary amines. Examples of such catalysts are: dibutyltinlaurate, tin octoate, cobalt naphthenate, vanadium acetylacetonate, dimethyl-tin-diethylhexanoate and mixtures thereof, triethylenediamine, tetramethylguanidine, dimethylcyclohexylamine, etc. Preferred catalysts are triethylenediamine and dibutyltinlaurate.

These catalysts are used in the usual catalytic concentrations and generally not higher than about 0.1% by weight.

Organic polyisocyanates useable in the preparation of the aqueous dispersions of the present invention may be low, middle and/or high molecular weight polyisocyanates. Examples of low molecular weight polyisocyanates are those of the general formula:

$$OCN-R-NCO \qquad (I)$$

wherein R represents an alkylenic, cycloalkylenic, alkyleniccycloalkylenic or arylenic radical containing from 1 to 20 carbon atoms.

Examples of these polyisocyanates are: 2,4-toluenediisocyanate alone or mixed with the isomer 2,6-toluenediisocyanate; 4 4'-diphenylmethanediisocyanate; 4,4'-dicyclohexylmethanediisocyanate; 1-isocyanate-3-isocyanatemethyl-3,5,5-trimethylcyclohexane (or isophoronediisocyanate); 2,2,4-trimethylhexamethylene-diisocyanate mixed with the isomer 2,4,4-trimethylhexamethylene-diisocyanate; ethylidene-diisocyanate, butylene-diisocyanate, hexamethylene-diisocyanate, cyclohexylene-1,4-diisocyanate; cyclohexylene-1,2-diisocyanate, xylylene-diisocyanate; dichloro-hexamethylene-diisocyanate; dicyclo-hexyl-4,4'-diisocyanate; 1-methyl-2,4-diisocyanate-cyclohexane; 1-methyl-2,6-diisocyanate cyclohexane, etc. Among these polyisocyanates, the aliphatic or cycloaliphatic diisocyanates are preferred when high resistance to UV rays and to hydrolytic degradation is wanted.

Examples of middle or high molecular weight polyisocyanates are those having a different condensation degree, which can be obtained from the phosgenation of anilineformaldehyde condensates. These products consist of mixtures of polymethylenepolyphenylisocyanates of the general formula:

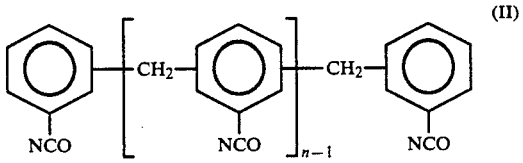

(II)

wherein n represents an integer higher than or equal to 1.

Particularly preferred polyisocyanates are the mixtures of polymethylenepolyphenylisocyanates having a middle functionality 2.6-2.8; these products are known under different trade names such as "Tedimon 31" of the Montedipe Company, "PaPi" of Upjohn, and "Mondur MR" of the Mobay Company.

Macroglycols which may be used for preparing the aqueous dispersions of the present invention may be chosen from among those essentially linear having a molecular weight between 60 and 6000, and preferably between 200 and 2000, generally aliphatic or cycloaliphatic, and chosen from among saturated polyesters, polyethers, polyester-urethanes, polyether-urethanes, polyurethane-amides or mixtures thereof.

Examples of suitable polyesters are the polycondensation products of anhydrides or dicarboxylic acids, preferably aliphatic having from 4 to 9 C, such as the succinic, adipic, sebacic, azelaic acids or anhydrides with aliphatic diols containing from 2 to 8 carbon atoms alone or mixed among them, such as for instance ethylene glycol, propylene glycol, 1,3 and 1,4-butanediol, 1,6-hexanediol, etc. or the polycondensation products on diol "starters" of ε-caprolactone.

Examples of polyester-urethanes are the polyaddition products of the above-mentioned polyesters with organic diisocyanates, the organic diisocyanates being present in minor molar amounts.

Examples of polyethers are the different types of polyethylene glycol, polypropylene glycol and the polymerization products of tetrahydrofurane.

According to an alternative, macroglycols may be used with low molecular weight diols such as for instance 2,2-bis-(4-hydroxycyclohexyl)propane.

It is possible to select as polyols containing in the same molecule at least one ionizable group and at least one ethylenic unsaturation the reaction products between at least one unsaturated diacid, or the corresponding anhydride, and at least one low molecular weight, for instance lower than 600, polyvalent alcohol containing at least three hydroxy groups such as trimethylolpropane, trimethylolethane, glycerine, 1,2,6-hexanetriol, polycaprolactonetriol, ethoxylated or propoxylated pentaerythite, triethanolamine, triisopropanolamine, trihydroxyethylisocyanurate, etc.

Examples of unsaturated diacids or the corresponding anhydrides useable for the preparation of the aqueous dispersions of the present invention are fumaric acid, or maleic acid, itaconic acid, citraconic acid, and the corresponding anhydrides, etc.

As ionizable groups those imparting an anionic charge to the oligourethane are preferred, in that in this case finished products are obtained compatible with additives, pigments, dyestuffs and aqueous dispersions of different types (for instance acrylic, vinyl, butadiene-acrylonitrile etc. dispersions) which are of the anionic type.

The reaction between the acid or the anhydride and the low molecular weight polyvalent alcohol is carried out in such manner as to obtain a hemiester, by working at temperatures between 50° and 100° C. until a constant acidity number is obtained and, optionally, by working under reduced pressure, generally between 5 and 10 KPa.

The macroglycol and the polyol of point (a) previously described are used for the preparation of the oligourethane in such a manner that molar ratios between the corresponding hydroxy groups are between 0.1 and 10.

The salification of the oligourethane is preferably carried out in the molten state and may be carried out by simply adding the salifying agent as such or dissolved in water and/or solvent at a temperature between 50° and 80° C. If the molten oligourethane has too high a viscosity at these temperatures it is suitable to dilute the oligourethane, before salifying it, with solvents preferably miscible with water and having a boiling temperature lower than that of the water, in order to remove them by distillation. Examples of suitable solvents are acetone, methyl-ethylketone, tetrahydrofurane.

Alternatively, it is possible to work in the presence of an ethylenically unsaturated monomer, liquid at room temperature and inert in the phase of preparation of the oligourethane which would react in the previously described polymerization of point (d).

Finally, it is possible to use an inert solvent not removeable by distillation, which therefore remains in the finished product wherein it develops a coalescent action. Examples of such solvents are N-methylpyrrolidone, glycolethers, alcoholic esters, etc. The quantity of solvent generally necessary is not over one fifth of the weight of the oligourethane.

To salify the oligourethane, salifying agents are preferably used selected from inorganic bases such as sodium or ammonium hydroxide and organic suitable bases such as the tertiary amines or alkanolamines. Examples of organic bases are triethylemine, dimethylethanolamine, methyldiethanolamine, etc.

After the salification, the oligourethane may be diluted with water in any desired ratio. Therefore, the water dispersion is produced in such a manner as to have a solids content higher than 20% by weight.

By the water-dispersion elongation of the chain occurs by the reaction of free isocyanic groups with water or, optionally, with organic polyamines containing at least 2 primary amino groups, such as e.g. ethylenediamine, diethylenetriamine, hydrazine, etc. Generally, these organic polyamines are added in a quantity between 0 and 10% by weight based on the oligourethane. The unsaturated oligourethane dissolved or dispersed in water as above described, may then be copolymerized with alpha-beta-ethylenically unsaturated monomers according to per se known techniques.

Examples of alpha-beta-ethylenically unsaturated monomers are: the esters of acrylic and methacrylic acid such as ethyl acrylate, butyl acrylate, 2-ethyl-hexyl acrylate, cyclohexylchloro acrylate, isobutyl-chloroacrylate, methylchloro-acrylate, methyl methacrylate, butyl-methacrylate, stearyl-methacrylate, phenyl-methacrylate, isopropylmethacrylate, cyclo-hexylmethacrylate, 3,3-dimethyl-2-butylmethacrylate, etc.; acrylonitrile, methacrylonitrile; the corresponding amides such as acrylamide and methacrylamide optionally in the methylolated and/or successively etherified form with $C_1$-$C_4$ monovalent alcohols; vinyl esters and ethers such as vinyl acetate, vinyl propionate; vinyl chloride, vinylidene chloride, vinyl-ethyl-ether; aromatic compounds such as styrene, vinyl-toluene, 4-methylstyrene, 4-methoxy-styrene, 3,4-dimethyl-styrene, 2,6-dichlorostyrene, 2,4-dichlorostyrene, 2-chlorostyrene, 3-chlorostyrene, 4-chloro-styrene, 4-chloro-2-methyl-styrene, etc.; and allyl compounds such as allyl alcohol, allyl-acetate etc.

It is also possible to use monomers containing two or more ethylenically unsaturated groups, such as butanediol diacrylate and dimethacrylate, hexanediol diacrylate and dimethacrylate, trimethylolpropane triacrylate and trimethacrylate, pentaerythritol triacrylate and trimethacrylate.

The alpha-beta-ethylenically unsaturated monomers are polymerized in the presence of the aqueous solution or dispersion of unsaturated oligourethanes according to known emulsion polymerization techniques and using well known promoters for the free radical polymerization such as potassium and ammonium persulfates, hydrogen peroxide, alkyl hydroperoxides such as ter-butylhydroperoxide, cumenehydroperoxide, p-menthane-hydroperoxide, di-cumyl-peroxide, benzoyl-peroxide, azo-bis-isobutyronitrile, etc.

Preferably, these promoters are used in the presence of reducing agents, per se known in the prior art, to reduce the temperature of the radical decomposition, such as sodium metabisulfite, sodium-formaldehyde sulfoxylate, formic acid, ascorbic acid, etc.

Examples of promoter/reducer couples preferred in the present invention are: ter-butyl-hydroperoxide/-sodium-formaldehyde sulfoxylate and hydrogen peroxide/ascorbic acid.

The quantities of promoter used are between 0.01 and 2%, preferably between 0.1 and 1%, by weight based on the total weight of the monomers.

Monomers may be fed in bulk or by feeding times from 2 to 6 hours.

The promoter is fed within 2-6 h. by feeding it gradually and within the feeding time at least 10' higher than that of the monomer.

Polymerization temperatures depend either on the type of the monomers used, or on the catalytic system; they are generally between 50° and 100° C., and preferably between 30 and 80° C.

Stable aqueous dispersions are obtained having a content in dry substance over 20% by weight, and preferably between 30 and 50%, and wherein the quantity of oligourethane, in the dispersed polymer, is over 10% by weight, generally between 20 and 70%; these dispersions are useable for coatings of different substrates, for instance wood, metal, plastic materials, fabric and may be applied by known techniques e.g by brush, spray, dipping, etc.

The stability of the above-mentioned dispersions depends on the number of ionic centers contained in the macromolecules and which may be expressed as meq/100 g of the dry polymer, and are preferably between 20 and 40 meq/100 g.

Films and coatings obtained by the dispersions of the present invention are distinguished by their improved properties, such as flexiblity, elasticity, hardness, appearance, brightness and, as compared to the products known in the prior art, by the alkali and organic-solvent resistance.

EXAMPLES

In order still better to understand the present invention and the practical embodiments of the same, some illustrative but not limitative examples are given hereinafter.

EXAMPLE 1

Into a reaction appartus provided with agitator, thermometer, condenser, and device for heating and cooling, there are introduced under nitrogen (A) 29.4 g of maleic anhydride (0.3 mols) and (B) 40.2 g of trimethylolpropane (0.3 mol). The mixture is heated to 85° C. and is maintained at this temperature until a constant acidity number is reached (theoretical value 242 mg KOH/g). There are added (C) 195 g of polyoxytetramethyleneglycol (M.W. 1000; mol 0.195), (D) 31.2 g of 2,2-bis-(4-hydroxycyclohexyl)propane (0.13 mol), and (E) 150 g of N-methylpyrrolidone.

The temperature is adjusted at 40° C. and (F) 0.2 g of benzoyl chloride and (G) 208.1 g of isophorone diisocyanate (0.9375 mol) are added. The reaction mixture is heated to 85° C. and maintained at this temperature until the —NCO content is 5%.

Thereafter, (H) 26.7g of dimethylethanolamine (0.3 mol) with (I) 1038 g of deionized water are added and the temperature is raised to 50° C.; the whole is allowed to react until —NCO disappears.

(L) 370 g of methylmethacrylate (3.7 moles), (M) 30 g of styrene (0.288 mole), and (N) 50 g of a 25% solution of surfactant (nonyl phenol ethoxylate (4 mols)ammonium phosphate) are added.

The whole is heated to 60° C. and within about 120 minutes (Q) 45 g of a 8% terbutylhydroperoxide solution and (P) 45 g of a 4% sodium sulfoxylate solution are fed. At the end of this operation the mixture is allowed to react at 60° C. for 30 minutes and thereafter it is cooled.

A stable emulsion is obtained with a 43% dry substance content.

EXAMPLE 2

Example 1 is repeated by replacing (B) by 164.5 g of polycaprolactonetriol (M.W. 540; 0.3 mol).

The reaction is carried out until an acidity number equal to 88 mg KOH/g is reached; thereafter, (C), (D), (E), (F), (G), are added and the polymerization is carried out until —NCO is 4.2%.

The operation is carried out as in Example 1.

EXAMPLE 3

This is carried out as in Example 1 by replacing (B) by 164.5 g of trifunctional polyester RUCOFLEX F-2311 (Ruco Polymer Corporation) (M.W. 540-0.3 mol). The reaction is carried out as in Example 2.

EXAMPLE 4

This is carried out as in Example 1, reducing the quantity of (I) to 738 g. The remaining 300 g of deionized water are used for the preparation of a pre-emulsion with (L), (M) and (N) which is fed to the reaction mixture simultaneously with (Q) and (P) within about 120 minutes.

At the end of the feeding, the whole is allowed to react at 60° C. for 30 minutes and then it is cooled.

COMPARISON EXAMPLE

Into a reaction apparatus equipped with agitator, thermometer, condenser, and device for heating and cooling, there are introduced under nitrogen 195 g of polyoxytetramethyl-eneglycol (M.W. 1000; 0.195 mol), 31.2 g of 2,2-bis(4-hydroxycyclohexyl)-propane (0.13 mol), 49.6 g of 2,2,-(hydroxymethyl)-propionic acid (0.37 mol), and 110 g of N-methyl pyrrolidone. The temperature is adjusted at 40° C. and 0.23 g of benzoyl chloride and 231.4 g of isophorone diisocyanate (1.0425 mol) are added. The reaction mixture is heated to 90° C. and maintained at this temperature until an —NCO content equal to 6% is reached; thereafter, the reaction mixture is cooled to 70° C.; the nitrogen is replaced by air and 405.9 g of methylmethacrylate (4.055 mols) and 27.1 g of hydroxypropylacrylate (0.2085 mol) are added; the whole is kept at 60° C. until the —NCO content is 2.7%.

Thereafter 32.9 g of dimethylethanolamine (0.37 mol), 64 g of 25% solution of the surfactant (nonylphenolethoxylate (4 mols) ammonium phosphate), and 969.7 g of deionized water are added and the whole is allowed to react at 60° C. until —NCO disappears.

The reaction mixture is cooled to 50° C., air is again replaced by nitrogen, and 47 g of an 8% solution of ter-butylhydroperoxide and 45 g of a 4% solution of sodium sulfoxylate are fed within 120 minutes.

The mixture is allowed to react for a further 30 minutes at 50° C. and thereafter it is cooled, thus obtaining a stable emulsion, the dry substance content being 45%.

Products obtained in Examples 1,2,3 and 4 have been formulated as clear paints for wood and applied on sample pieces that, after having been dried at 23° and 50% relative humidity for 7 days, gave the following results:

|  | EX.1 | EX.2 | EX.3 | EX.4 | Comp. EX. |
| --- | --- | --- | --- | --- | --- |
| Persoz hardness s | 365 | 328 | 325 | 367 | 360 |
| Sward hardness | 70 | 30 | 54 | 84 | 60 |
| Taber abrasion mg (ASTM D1044) (CS17 500 g × 100 r) | 1.5 | 1.4 | 0.5 | 2.6 | 3 |
| Mark resistance (35 g/cm²)(ASTM D2091-67) | | | | | |
| 4 hr. at 60° C. | good | good | good | good | good |
| 18 hr. at 25° C. | good | good | good | good | good |
| Blockin resistance (300 g/cm²)(ASTM D2793-69) | | | | | |
| 4 hr at 60° C. | good | good | good | good | good |
| 18 hr at 25° C. | good | good | good | good | good |
| Spot resistance (48 h/25° C.-ASTM D2571) | | | | | |
| Water | n.m. | n.m. | n.m. | n.m. | n.m. |
| Ethyl alcohol | n.m. | n.m. | n.m. | n.m. | clear mark |
| 10% Citric acid | n.m. | n.m. | n.m. | n.m. | n.m. |
| 10% Acetic acid | n.m. | n.m. | n.m. | n.m. | n.m. |
| 10% Sodium hydroxide | n.m. | n.m. | n.m. | n.m. | clear mark |
| Coffee | n.m. | n.m. | n.m. | n.m. | n.m. |
| Sauce | n.m. | n.m. | n.m. | n.m. | n.m. |
| Olive oil | n.m. | n.m. | n.m. | n.m. | n.m. |

Remark: n.m. = no mark

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

What is claimed is:

1. Aqueous dispersions of urethane-acrylic polymer containing in the macromolecule hydrophilic ionic groups, obtained according to the following operations:
   a) preparation of an unsaturated oligourethane by reaction between at least one organic polyisocyanate and a mixture comprising at least one macroglycol and at least one polyol containing in the same molecule of said at least one polyol at least one ionizable group and at least one ethylenic unsaturation;
   b) salification of the thus-obtained oligourethane;
   c) dispersion of the salified oligourethane in water, optionally in the presence of organic polyamines;
   d) polymerization of the oligourethane with alpha-beta-ethylenically unsaturated monomers.

2. Dispersions according to claim 1, wherein the oligourethane of point (a) is obtained from at least one polyisocyanate and a mixture of macroglycols and polyols wherein the molar ratio between the isocyanic groups and the total sum of the hydroxyl groups is between 1.3 and 2.

3. Dispersions according to claim 1, wherein the oligourethane of point (a) is obtained from at least one polyisocyanate and a mixture of macroglycols and polyols wherein the molar ratio between the isocyanic groups and the total sum of the hydroxyl groups is between 1.4 and 1.7.

4. Dispersions according to claim 1, 2 or 3, wherein the organic polyisocyanates are low, middle and/or high molecular weight organic polyisocyanates.

5. Dispersions according to claim 4, wherein the low molecular weight polyisocyanates have the formula:

OCN—R—NCO  (I)

wherein R represents an alkylenic, cycloalkylenic, alkyleniccycloalkylenic or arylenic radical containing from 1 to 20 carbon atoms.

6. Dispersions according to claim 4, wherein the middle or high molecular weight polyisocyanates have a different degree of condensation obtained by the phosgenation of aniline-formaldehyde condensates and consisting of mixtures of polymethylenepolyphenylisocyanates having the formula:

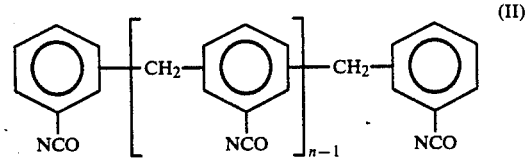

(II)

wherein n represents an integer higher than or equal to 1.

7. Dispersions according to claim 1, 2 or 3, wherein the macroglycols are selected from linear macroglycols having a molecular weight between 60 and 6000, generally aliphatic or cycloaliphatic, and selected from the group consisting of saturated polyesters, polyethers, polyester-urethanes, polyether-urethanes, polyurethane-amides or mixtures thereof.

8. Dispersions according to claim 1, 2 or 3, wherein the macroglycols are selected from linear macroglycols having a molecular weight between 200 and 2000, aliphatic or cycloaliphatic, and selected from the group consisting of saturated polyesters, polyethers, polyester-urethanes, polyether-urethanes, polyurethane-amides or mixtures thereof.

9. Dispersions according to claim 1, 2 or 3, wherein the macroglycols are used with low molecular weight diols.

10. Dispersions according to claim 1, 2 or 3, wherein the polyols containing in the same molecule at least one ionizable group and at least one ethylenic unsaturation are the reaction products between at least one unsaturated diacid, or the corresponding anhydride, and at least one low molecular weight polyvalent alcohol containing at least three hydroxyl groups.

11. Dispersions according to claim 1, 2 or 3, wherein the polyols containing in the same molecule at least one ionizable group and at least one ethylenic unsaturation are the reaction products between at least one unsaturated diacid, or the corresponding anhydride, and at least one low molecular weight polyvalent alcohol having a molecular weight lower than 600 and containing at least three hydroxyl groups.

12. Dispersions according to claim 10, wherein the unsaturated diacids, or the corresponding anhydrides, are fumaric acid, or maleic acid, or itaconic acid, or citraconic acid, or the corresponding anhydrides.

13. Dispersions according to claim 10, wherein the polyvalent alcohol is selected from the group consisting of trimethylolpropane, trimethylolethane, glycerine, 1,2,6-hexanetriol, polycaprolactonetriol, ethoxylated or propoxylated pentaerythrite, triethanolamine, triisopropanolamine and trihydroxyethylisocyanurate.

14. Dispersions according to claim 1, 2 or 3, wherein the reaction between the acid or anhydride and the low molecular weight polyvalent alcohol is carried out in such a manner as to obtain a hemiester, by working at temperatures between 50° and 100° C., until a constant acidity number is reached and optionally by working under a reduced pressure generally between 5 and 10 KPa.

15. Dispersions according to claim 1, 2 or 3, wherein the macroglycol and the polyol used in the preparation of the oligourethane are used in a molar ratio between the corresponding hydroxyl groups of the macroglycol and the polyol between 0.1 and 10.

16. Dispersions according to claim 1, 2 or 3, wherein the salification of the oligourethane is performed in the molten state or in the presence of water-miscible solvents and with a boiling temperature lower than that of the water.

17. Dispersions according to claim 1, 2 or 3, wherein the salification of the oligourethane is carried out with salifying agents selected from the group consisting of organic bases, such as tertiary amines or alkanolamines or from inorganic bases such as sodium or ammonium hydroxide.

18. Dispersions according to claim 1, 2 or 3, wherein the alpha-beta-ethylenically unsaturated monomer is selected from the group consisting of esters of acrylic acid, acrylonitrile, methacrylonitrile and the corresponding amides.

19. Dispersions according to claim 1, 2 or 3, having a final content of dry substance higher than 20% by weight, and wherein the quantity of the oligourethane in the dispersed polymer is over 10% by weight.

20. Dispersions according to claim 1, 2 or 3, having a final content of dry substance between 30 and 50% by weight, and wherein the quantity of the oligourethane in the dispersed polymer is between 20 and 70%.

21. Dispersions according to claim 1, 2 or 3, having a content of ionic centers in the macromolecules between 10 and 50 meq/100 g of dry substance.

22. Dispersions according to claim 1, 2 or 3, having a content of ionic centers in the macromolecules between 20 and 40 meq/100 g of dry substance.

23. Coating compositions for substrates such as wood, metal, plastic materials, fabric and applicable by techniques such as brush, spray and dipping, and containing a dispersion obtained according to claim 1, 2 or 3.

24. Dispersions according to claim 18, wherein the amides are in the methylolated and/or etherified form with $C_1$-$C_4$ monovalent alcohols, vinyl esters and esters, allyl compounds.

* * * * *